United States Patent [19]

Cooper

[11] Patent Number: 4,848,386
[45] Date of Patent: Jul. 18, 1989

[54] SMALL VEHICLE GARAGE

[76] Inventor: Wallace L. Cooper, 535 N. Oakland Ave., Pasadena, Calif. 91101

[21] Appl. No.: 254,866

[22] Filed: Oct. 7, 1988

[51] Int. Cl.$^4$ .................... E04H 15/08; E04H 15/06
[52] U.S. Cl. ........................................ 135/90; 135/89
[58] Field of Search .................. 52/63; 135/90, 101; 160/22, 46, 57, 59, 63, 77

[56] References Cited

U.S. PATENT DOCUMENTS

| 351,860 | 11/1886 | Glidden | 135/90 |
|---|---|---|---|
| 492,298 | 2/1893 | Johnson | 135/90 |
| 636,548 | 1/1899 | Owen | 135/90 |
| 964,455 | 7/1910 | Smith | 160/63 |
| 1,520,486 | 12/1924 | Sodemann | 135/101 |
| 2,520,625 | 8/1950 | Dean | 160/57 |
| 3,327,724 | 6/1967 | Nielsen | 135/89 |
| 4,175,576 | 11/1979 | Iby | 135/89 |
| 4,764,142 | 8/1988 | Griffith | 135/90 |

FOREIGN PATENT DOCUMENTS

| 130490 | 4/1902 | Fed. Rep. of Germany | 135/101 |
|---|---|---|---|
| 1184930 | 1/1965 | Fed. Rep. of Germany | 160/77 |
| 658242 | 4/1979 | U.S.S.R. | 52/63 |
| 1488351 | 10/1977 | United Kingdom | 135/90 |
| 2066867 | 7/1981 | United Kingdom | 52/63 |

Primary Examiner—Henry E. Raduazo
Attorney, Agent, or Firm—J. L. Jones, Sr.

[57] ABSTRACT

A top flexible rectangular shaped sheet shelter for motorcycle, moped, bicycle or the like narrow profile vehicle can quickly be erected to protect such a narrow profile vehicle from the weather elements. The protective rectangular shaped sheet has an opposed pair of sheet lengths and an opposed pair of sheet sides. A first linear rod wall mount, equivalent to the length of a parked motorcycle, moped, bicycle or the like profile vehicle is secured on the exterior wall of a house, recreational vehicle (RV), a standard motor vehicle garage, fence or the like. The detachable wall mount can have a simple sheet element which can be a film cover of plastic sheet, or an alternatively spring loaded roller shade sheet, disposed on a tubelike container. The sheet shelter element can be a foldable plastic film sheet or a waterproof woven fabric tarpaulin cover sheet, forming a tent-type protective structure against the climatic elements of rain, snow and hail. Separate first and second pivotal support rod elements are each singly disposed at the two opposed terminal ends of the length of plastic or tarpaulin sheet, and are pivotally connected to a third ridge pole rod element extending the length of the tarpaulin sheet. The third ridge pole is connected at opposed second two support rod terminals to the first two pivoted rod elements, forming a U-supporting frame for the flexible tarpaulin sheet which covers the motorcycle or the other narrow width vehicles. A fourth rod element is disposed and secured to the tarpaulin sheet opposed length at the second edge length opposed to the tarpaulin edge length secured to the exterior wall of a house, RV or the like. The weight of the fourth rod, when draped over the third cross rod, secures the tarpaulin in a protective sloped tent type cover over the vehicle. Second and third plastic sheets or tarpaulin covers can be connected by zipper, Velcro, or grommet and button fastenings to the top shelter cover sides, providing complete cover for the narrow profile vehicle.

4 Claims, 1 Drawing Sheet

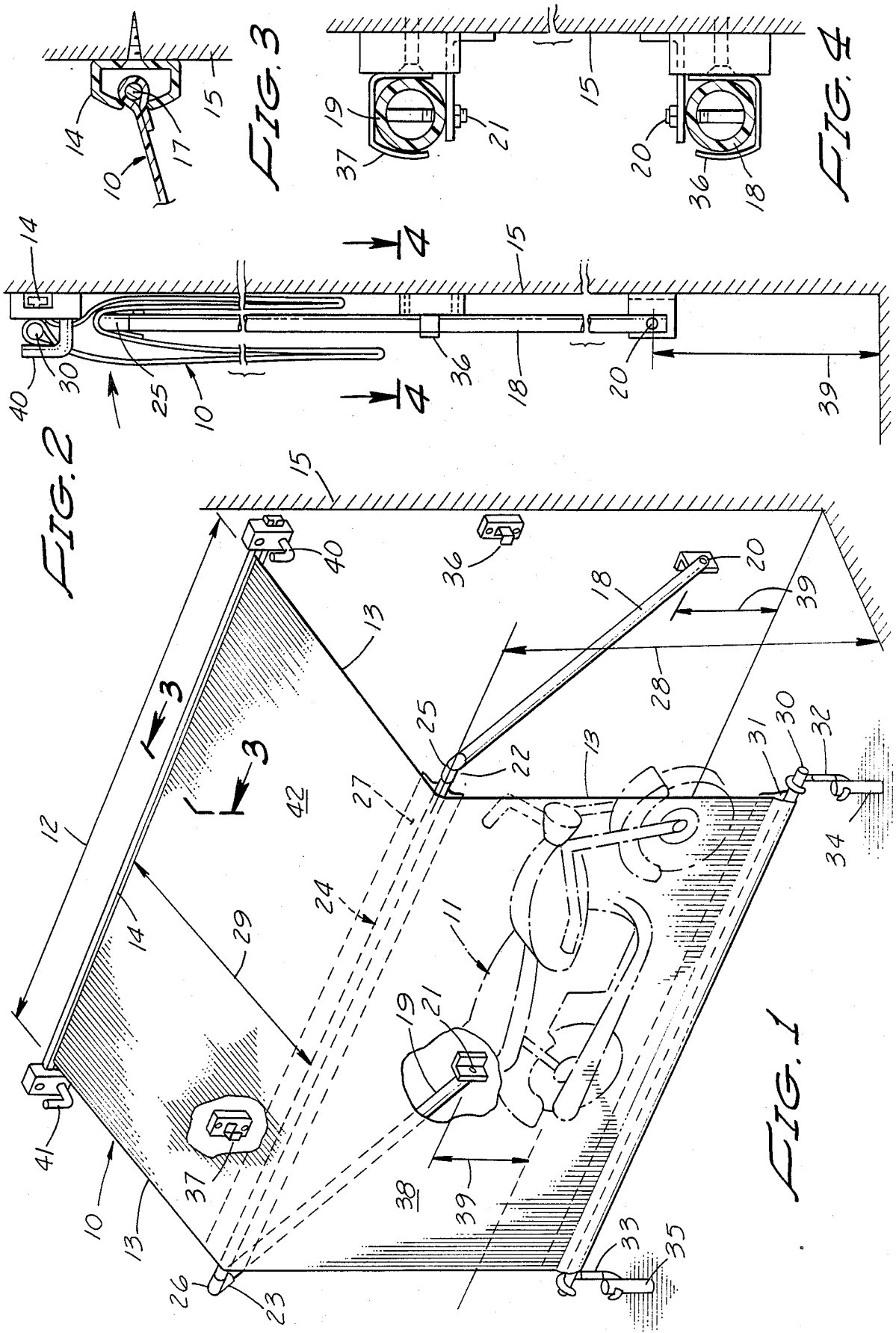

SMALL VEHICLE GARAGE

BACKGROUND OF THE INVENTION

The vehicle cover of this invention is classified in Class 135/90.89 and 160/67, 72, 65, 45, 50, 76, 77.

U.S. Pat. No. 4,607,654 issued Aug. 26, 1986 to Duda, discloses and teaches an awning latch assembly for a travel trailer or mobile home which includes a flexible awning covering wound on a roller which is rotatable on a fixed shaft carried by a supporting frame and adapted for normal adult human height use. A latch apparatus disposed and secured to the roller termini controls the roller against rotation.

U S. Pat. No. 4,195,877 issued Apr. 1, 1980 to Duda disclosed and taught an exterior room for a trailer in which front, rear and side panels cooperate with an external frame connected to the trailer body to provide an external screen room, adapted for normal adult human height use.

U.S Pat. No. 4,117,876 issued Oct. 3, 1978 to J. Richard Bennett, disclosed and taught an awning for a mobile home. The awning is supported by a pivotal front and a rear awning assembly arm and a roller for the awning, and is adapted for normal adult human height use.

U.S. Pat. No. 3,918,511 was issued Nov. 11, 1975, taught and disclosed by Upton An awning structure support mechanism, having an awning sheet roll means and related adjustable sheet awning length and width means, and adapted for normal adult human height use.

Upton, in U.S. Pat. No. 3,866,877, taught and disclosed on Feb. 18, 1975, an awning structure bracket, adapted for normal adult human height. An awning sheet, an awning roller, a roller support arm, and a first and second bracket member are constructed and inventively adapted to provide a cooperating awning structure.

Eckman and Keese, in U.S. Pat. No. 3,743,345, taught and disclosed on July 3, 1973, a multi-use camp structure having four telescopic posts on a motor vehicle and a canopy frame connected to the roof frame of the truck body.

In U.S. Pat. No. 3,446,220 issued May 27, 1969, Schafer taught and disclosed a roof top carrier for a normal adult human height use awning. A roll-up awning may protectively cover articles on the automobile, or serve as an awning or canopy alongside the vehicle when the carrying frame is fully or partially drawn out on its overhead track.

In U.S. Pat. No. 1,422,498 issued July 11, 1922, to Vint, a camping trailer is disclosed and taught, having auxiliary roofs over the beds, table and the like, when held by folding braces adapted for normal adult human height usage.

Fragee, in U.S. Pat. No. 743,706 issued Nov. 10, 1903, taught and disclosed a combined roller and swinging awning frame with awnings and end curtains to be secured to a building exterior and adapted for normal adult human height usage.

SUMMARY OF THE INVENTION

A flexible top rectangular shaped, sheet shelter for a motorcycle, moped, bicycle or the like narrow width profile vehicle, can quickly be erected to protect such a narrow width vehicle from the weather elements. The flexible top rectangular shaped sheet shelter has an opposed pair of shelter sheet lengths, and can have an opposed pair f sheet sides. The shelter sheet can be a heavy weight reinforced plastic sheet (typically 0.003 to 0.010 inch thick) and also resistant to deterioration in sunlight, or a waterproof woven fiber tarpaulin sheet. The narrow profile vehicle is defined as a motor or manual driven vehicle sized for transporting one to two adult humans, and whose vehicle maximum width is much less than that of a standard automobile.

A first linear rod wall mount, equivalent to the length of a parked motorcycle, moped, bicycle or the like narrow profile vehicle, is secured to the exterior wall of a house, a standard car garage, a recreational vehicle (RV), a fence or the like. The first linear rod mount concurrently secures the first shelter sheet length to the exterior wall of a house, garage, RV, high fence, or the like. The first linear rod mount can be detachable from the exterior wall and can be a spring loaded sheet shelter, with the first shelter sheet length disposed in a tube-like container whose length is equivalent to the shelter sheet length. Alternatively, the sheet shelter length can be an equivalent film cover of a fiber reinforced plastic sheet, resistant to the weather elements, and which can be folded by hand. Both shelter sheets can form a tent type protective structure against the climatic elements of rain, Snow and hail.

Separate first and second plastic rod support elements are each separately pivotally secured at the same height near the base of the exterior wall of the house, standard garage, RV, high fence or the like. The first and second plastic rod support elements can be unplasticized polyvinyl pipe, reinforced fiberglass pipe, polypropylene pip, or a like rod or pipe which will not deform in the hot sun, or fracture in the cold winter. The first terminus of each first and second plastic rod support element are each separately pivotally secured in a first and second pivotal fastening disposed on the exterior wall of the house, fence, standard garage, RV, or the like, enabling the rod support elements to be raised and lowered (rotated) in a vertical plane. The first and second plastic rod support elements are connected at their respective second termini to a third ridge pole rod by 90° elbows, forming a U-support frame which pivots from the first and second pivot fastening secured on the house, fence, standard garage, RV, or the like vertical exterior wall.

The third ridge pole is disposed and secured in a containing ridge pole first envelope formed in the full length of the flexible top sheet shelter. The containing ridge pole first envelope is spaced a fixed parallel distance from the linear rod wall mount, providing a ridge pole for the sheet shelter, the ridge pole being secured at a lower height from the ground than the first linear rod mount secured to an exterior vertical wall, thus inclining the rain, snow, or hail to slide forward and off the sheet shelter, away from the exterior vertical wall. The ridge pole envelope is spaced selected distance from the exterior vertical wall to provide a safe and comfortable parking space for the narrow width profile vehicle. The vehicle is contained within the narrow parking space and protected from the weather elements thereby.

The flexible sheet shelter extends a further spaced downward distance from the ridge pole, terminating in a second weight pole envelope equivalent in length to the first ridge pole. A fourth anchor pole is permanently disposed and secured in the second weight pole envelope, and secures the second area of the protective tent sheet shelter length over the vehicle side, vertically down, extending to the ground. A pair of bungie cords can be separately secured to each termini of the second weight pole and then to tent stakes anchored in the ground just below, holding the second weight pole snugly adjacent to the ground.

Thus, in use, the narrow width vehicle can be driven alongside the first linear rod wall mount, in parallel to the mount. The second area of the shelter, terminating at the fourth anchor pole, is taken off two separate anchor hooks which support the anchor pole at its termini, when not in use as a shelter. The anchor pole is lifted by one hand away from the anchor hooks, and distending the first and second rod elements angularly pivoting on the exterior support wall, until the first area of the flexible top is fully distended. The anchor pole is then dropped vertically, fully distending the second area of the flexible shelter. In weather climates having snow, hail and the like, third and fourth shelter areas can be disposed and secured to the first and second shelter areas by zippers, grommets, buttons and Velcro fasteners. The third and fourth shelter areas are anchored by third and fourth weight poles secured in their respective shelter area envelopes. A third and fourth pair of bungee cords and respective tent stakes can secure the third and fourth shelter areas to the ground, providing complete snug shelter for the vehicle.

The covering and uncovering of the vehicle can be done by one hand of the vehicle user, and requires only a few minutes of time.

The ridge pole can typically be a standard one inch diameter PVC pipe or a similar fiberglass pipe with polyester or epoxy resin reinforcement. Included in the objects of this invention are:

To provide a flexible, easily erected, shelter for a narrow width profile adult transportation vehicle, such as a motorcycle, moped, bicycle, and other narrow width vehicles.

To provide a low cost, protective outdoor flexible shelter for a motorcycle, moped, bicycle, or the like narrow width vehicle for adult humans.

To provide a flexible shelter for a narrow width profile motor or manually driven vehicle outdoors, protecting the vehicle against weather elements.

To provide a flexible shelter for a narrow width profile motor driven or manually driven transportation vehicle, which can be easily removed as a cover on the vehicle with one arm and hand.

Other objects and advantages of this invention are taught in the following description and claims.

BRIEF DESCRIPTION OF THE DRAWINGS

The description of this invention is to be read in conjunction with the following drawings:

FIG. 1 is an elevational perspective view of the sheet shelter 10 of this invention, erected, expanded and enclosing a typical narrow motor vehicle, a motorcycle.

FIG. 2 is a side elevational view of the sheet shelter 10 in a closed, unexpanded position, without any vehicle in position alongside the shelter.

FIG. 3 is a side sectional view of a wall mount 14 disposed and secured on an exterior vertical wall 15, with tube 17 securing the 10.

FIG. 4 is a side sectional view of the rods 18 and 19 secured in holding clamps 36 and 37, as previously illustrated in FIG. 2.

DESCRIPTION OF THE PREFERRED EMBODIMENT OF THE INVENTION

Referring to FIG. 1 in detail, the sheet shelter 10 is shown, enclosing a typical narrow profile motor vehicle, a motorcycle 11. The top flexible rectangular shaped sheet shelter 10 has an opposed pair of sheet lengths 12 and another opposed pair of sheet sides 13. The sheet shelter 10 can be a heavy weight reinforced plastic sheet, typically 0.003 to 0.010 inch thick, and it is also resistant to deterioration in sunlight. The sheet shelter 10 can be reinforced with filaments of fiberglass or other fiber threads disposed in the sheet 10.

A first linear rod wall mount 14, equivalent in length to the parked vehicle, moped, bicycle 11 is secured to the exterior wall 15 of a house, a standard car garage, a recreational vehicle (RV), high fence or the like. The first linear wall mount 14 can be detachable from the exterior wall 15. A preferred modification of sheet shelter 10 can have a length 12 of film cover of reinforced plastic sheet or woven fabric, resistant to the weather element and which can be folded by hand. The sheet shelter 10 can be disposed and secured on a rod length 17. Shelter sheet of length 12 can form a protective structure against the climatic elements of rain, snow and hail.

Separate first plastic rod 18 and second plastic rod 19 support elements are each separately secured by a respective first pivot 20 and a second pivot 21 at the safe height 39 on the exterior wall 15 of the house, standard garage, RV, high fence or the like. The first plastic rod 18 and second plastic rod 19 can be unplasticized polyvinyl chloride pipe, reinforced fiberglass pipe, polypropylene pipe, or the like rod or pipe which will not deform in the hot sun or fracture in the cold weather The first terminus of each first 18 and second 19 plastic rod support element are each pivotally secured in a first 20 and second 21 pivotal fastener disposed and secured on the exterior wall 15 of the house, fence, standard garage, RV, or the like, enabling the rod elements 18 and 19 to be raised and lowered (rotated) in a vertical plane of wall 15. The first 18 and second 19 elements are connected at their respective second termini 22 and 23 to a third ridge pole rod 24 by the respective 90° elbows 25 and 26, forming a U-support frame which pivots from the first pivot fastener 20 and the second pivot fastener 21 second secured on the exterior wall 15 of the house, fence, standard garage, RV, or the like vertical exterior wall 15.

The third ridge pole 24 is disposed and secured in a containing ridge pole first envelope 27 formed in the full length 12 of the flexible top sheet shelter 10. The containing ridge pole first envelope 27 is spaced a constant fixed parallel distance 29 from the linear rod wall mount 14, providing a ridge pole 24 for the sheet shelter 10. The ridge pole 24 is secured at a lower height 28 from the ground than the first linear rod mount 14, thus inclining the rain, snow, hail to slide forward and off the sheet shelter 10, away from the exterior vertical wall 15. The ridge pole 24 is spaced a selected distance from the wall 15, providing a safe and comfortable parking space distance 29 for the narrow width typically vehicle, the vehicle is typically contained in the 4.0 foot width by 8.0 foot long space.

The sheet shelter 10 extends a further space downward distance from the ridge pole, terminating in a second weight pole envelope 31, containing the weight pole 30, the pole 30 is substantially equivalent in length to ridge pole 24. The second area of the shelter 10 extends to the ground, weighted by the weight pole 30. A pair of bungee cords 32, 33 can be separately secured to each termini of weight pole 30, and then to tent stakes 34, 35 respectively secured in the ground just below, holding the pole 30 snugly adjacent to the ground The narrow width vehicle 11 can be driven alongside the first linear wall mount 14, in parallel to the wall mount 14. The second area 38 of sheet 10, terminating at the fourth weight anchor pole 30 is contained in the long envelope 31. The pole 30 is taken off the support hooks 40 and 41, which support the anchor pole 30 when it is not in use as a weight anchor pole 30. The then distended first and second rod elements 18 and 19 are then rotated out of clamps 36 and 37 by angular pivoting until the top area 42 of shelter 10 is fully distended. The weight anchor pole 30 is dropped, fully distending area 38, of shelter 10. The first pair of bungee cords 32 and 33 are secured to the opposed termini of pole 30 and to the tent stakes 34 and 35 anchored in the ground.

If weather climates have snow and hail the shelter top 42 and the area 38 can be fully covered at the sides of shelter 10 by a protective pair of shelter sides (not shown for clarity reasons). The side of shelter 10 can be secured to 10 by fastener means, such as zippers, grommets and rotatable buttons, Velcro fastener strips sewn on shelter sides 13, button and eyeholes in conventional securing means. A third and fourth pair of bungee cords and tent stakes in the ground can restrain the side areas.

FIG. 2 illustrates the shelter 10 in a folded position erected against a vertical wall 15. A wall mount 14 is covered by an anchor hook 40 which supports pole 30, enclosed in envelope 31. The sheet 12 is shown draped and partially on first rod element 18, which is held in clip 36. The pivot 20 supports the first terminus of 18.

FIG. 3 illustrates a sectional view through 3-3 of FIG. 1 wherein the wall mount 14 is secured to wall 15 and shelter sheet 10 is secured by tube 17 in the mount 14.

FIG. 4 illustrates the wall clips 36 and 37 mounted on vertical wall 15 at the adaptively sized and selectively positioned to receive the plastic rods 18 and 19, when rods 18 and 19 are positioned against the wall 15.

The covering and uncovering of the vehicle 11 can be done manually by the single hand of the vehicle user, and requires only a minute of time. The ridge pole and the weight pole can be PVD or fiberglass pipe with polyester or epoxy resin reinforcement, one inch or less in diameter.

Many modifications in the small vehicle garage can be made in the light of my teachings. It is understood that within the scope of the claims, the invention can be practiced otherwise than as described.

I claim:

1. A small vehicle garage for a narrow profile vehicle having a length, narrow width, and a low height, said garage comprising:
    a rectangular shaped flexible waterproof shelter sheet having an opposed pair of equivalent sheet lengths and having an opposed pair of equivalent sheet sides, said sheet lengths at least equivalent to a narrow profile vehicle length, and said sheet sides at least equivalent to said narrow profile vehicle width plus said vehicle height,
    a first linear rod wall mount having a length equivalent to said flexible waterproof sheet length, having means for adaptively disposing and securing a first opposed sheet length to a vertical wall at a wall height just above said narrow vehicle,
    a ridge pole disposed in a ridge pole container envelope as a combination in said flexible sheet, aforesaid combination disposed and secured a constant distance width of said narrow profile vehicle from said first rod wall mount, said ridge pole and pole container envelope combination at least equivalent in length to said vehicle, said ridge pole adaptively sized to prevent sagging in usage,
    a pair of equivalent length support rod elements, each separately disposed at each of the two sides of said flexible sheet length, each support rod having a first and second terminus, each first terminus of aforesaid rods having a pivotal flange fixture affixed thereto and affixed to said vertical walls, and each second terminus of said support rods affixed to a 90° elbow which is in turn affixed to one terminus of said ridge pole, forming a U-support frame, said pivotal flange fixture disposed to provide rotation of said pair of support rods normally into and out of said vertical wall, said U-frame supporting a first area of said waterproof sheet angularly over aforesaid narrow profile vehicle parked alongside said wall mount, said pair of support rod elements adaptively sized to prevent sagging in usage, and,
    a weight pole disposed in a weight pole envelope as a combination, aforesaid combination located and secured adjacent to the sheet length opposed to said sheet length secured to said wall mount, the weight of said weight pole maintaining the remaining area of said shelter sheet in a vertical plane when said shelter is in use as a narrow profile vehicle garage, said weight pole adaptively sized to prevent sagging in usage.

2. In the narrow profile vehicle garage set forth in claim 1, the further modification wherein,
    a pair of shelter sheet areas fitting the two opposed shelter sheet sides, and each separate sheet area disposed and secured to one said opposed sheet side by fastener means, providing a complete enclosure for said narrow profile vehicle.

3. In the narrow profile vehicle garage set forth in claim 1, the further modification wherein,
    a pair of bungee cords fitted on the opposed termini of a weight pole disposed and secured on the shelter sheet length, and,
    a pair of tent stakes fitting in the ground directly below each bungee cord and secured to aforesaid cords tightly securing said weight pole toward the ground.

4. A small vehicle garage for a narrow profile vehicle having a length, narrow width, and a low height, said garage comprising:
    a rectangular shaped flexible waterproof shelter sheet having an opposed pair of equivalent sheet lengths and having an opposed pair of equivalent sheet sides, said sheet lengths at least equivalent to a narrow profile vehicle length, and said sheet sides at least equivalent to said narrow profile vehicle width plus said vehicle height,
    a first linear rod wall mount having a length equivalent to said flexible waterproof sheet length, having means for adaptively disposing and securing a first opposed sheet length to a vertical wall at a wall height just above said narrow vehicle, a ridge pole disposed in a ridge pole container envelope as a combination in said flexible sheet, aforesaid combination disposed and secured a constant distance width of said narrow profile vehicle from said first rod wall mount, said ridge pole and pole container envelope combination at least equivalent in length to said vehicle, said ridge pole adaptively sized to prevent sagging in usage, a pair of equivalent length support rod elements, each separately disposed at each of the two sides of said flexible sheet length, each support rod having a first and second terminus, each first terminus of aforesaid rods having a pivotal flange fixture affixed thereto and affixed to said vertical walls, and each second terminus of said support rods affixed to a 90° elbow which is in turn affixed to one terminus of said ridge pole, forming a U-support frame, said pivotal flange fixture disposed to provide rotation of said pair of support rods normally into and out of said vertical wall, said U-frame supporting a first area of said waterproof sheet angularly over aforesaid narrow profile vehicle parked alongside said wall mount, said pair of support rod elements adaptively sized to prevent sagging in usage, a weight pole disposed in a weight pole envelope as a combination, aforesaid combination located and secured adjacent to the sheet length opposed to said sheet length secured to said wall mount, the weight of said weight pole maintaining the remaining area of said shelter sheet in a vertical plane when said shelter is in use as a narrow profile vehicle garage, said weight pole adaptively sized to prevent sagging in usage, a pair of bungee cords fitted on the opposed termini of said weight pole disposed and secured on the shelter sheet length, and, a pair of tent stakes fitting in the ground directly below each bungee cord and secured to aforesaid cords, tightly securing said weight pole toward the ground.

* * * * *